Jan. 12, 1971 J. T. BROWN ET AL 3,554,802
PROCESS FOR MAKING SULFUR IRON ACTIVE
MATERIAL FOR BATTERY PLATES
Original Filed Oct. 2, 1968
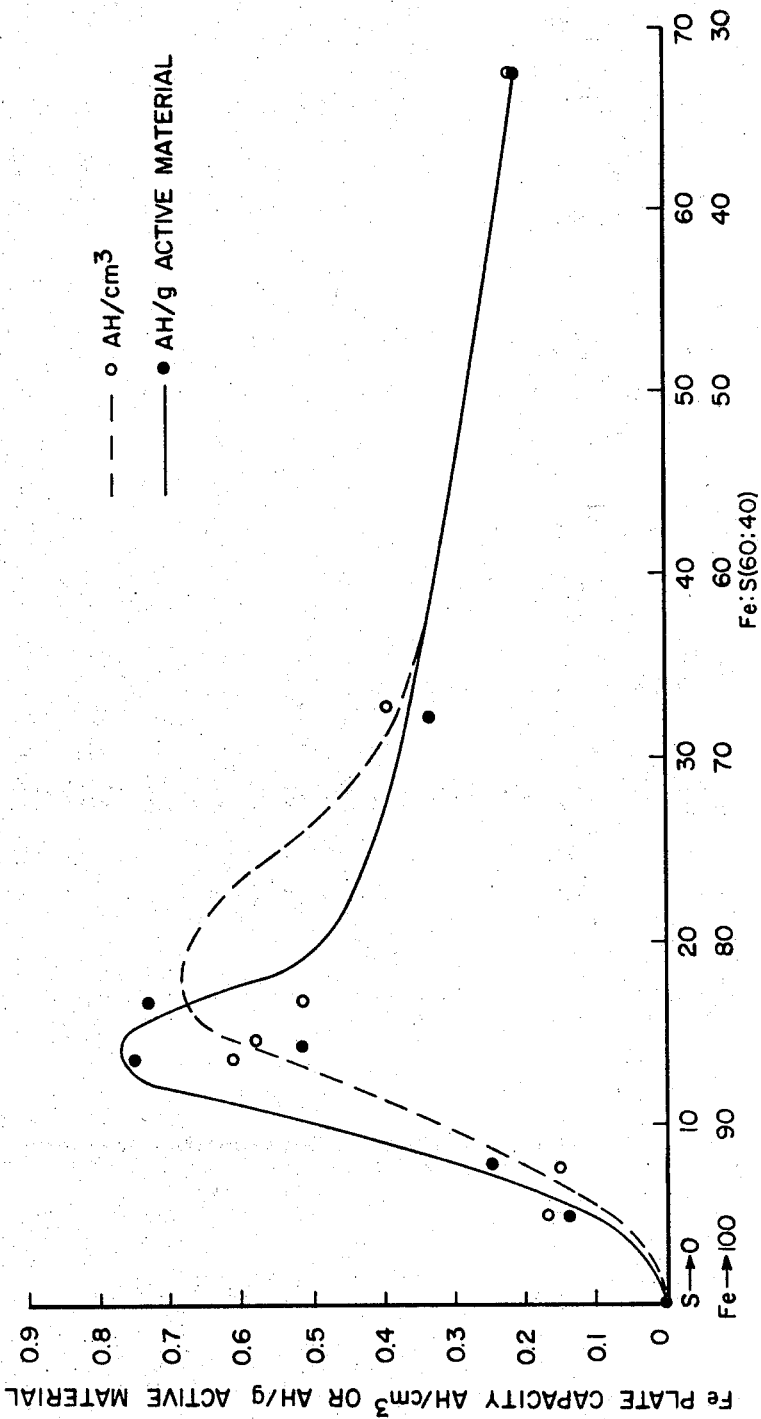
WITNESSES
Theodore T. Wrobel
Daniel P. Cillo
INVENTORS
Jack T. Brown and
William Feduska
BY Alex Mich Jr.
ATTORNEY United States Patent Office 3,554,802
Patented Jan. 12, 1971

3,554,802
PROCESS FOR MAKING SULFUR IRON ACTIVE MATERIAL FOR BATTERY PLATES
Jack T. Brown, Pittsburgh, and William Feduska, Edgeworth, Pa., assignors to Westinghouse Electric Corporation, Pittsburgh, Pa., a corporation of Pennsylvania
Continuation of application Ser. No. 764,457, Oct. 2, 1968. This application Dec. 8, 1969, Ser. No. 878,988
Int. Cl. H01m *13/00, 43/04*
U.S. Cl. 136—25         8 Claims

ABSTRACT OF THE DISCLOSURE

A method of producing active battery material comprises adding a ferric ammonium sulfate or ferrous ammonium sulfate solution to an aqueous solution of potassium hydroxide and potassium sulfide to form a precipitate containing at least 5 weight percent sulfur based on the weight of iron.

The present application is a continuation of application Ser. No. 764,457 filed Oct. 2, 1968, now abandoned.

BACKGROUND OF THE INVENTION

This invention relates to an improved method of producing active material for battery plates.

Currently, iron active material for electric storage batteries is prepared by reacting an impure iron with sulfuric acid to form ferrous sulfate, which is further treated in a variety of operations to produce a suitable iron active material. Such an iron active material generally comprises about 50 percent iron and about 50 percent $Fe_3O_4$.

Heretofore, sulfur or sulfur bearing materials have been added to the iron in rather minute amounts. U.S. Ser. No. 709,345 filed on Feb. 29, 1968, now abandoned and assigned to the assignee of this invention by Langer and Patton, teaches the use of sulfur in large quantities as an additive to prevent passivation of the iron during discharge, and to create favorable conditions for an effective acceptance of charge. Langer and Patton taught the addition of hydroxide-sulfide solution to hydrated ferric ammonium sulfate solution. The best capacity per unit weight values attained by that method were .62 amp-hr./gram iron. There is a need, however, for active materials which will give even greater values and so produce superior batteries.

SUMMARY OF THE INVENTION

Accordingly, it is the object of this invention to provide an improved iron active battery material and an improved method of making such active material.

Our invention accomplishes the foregoing object by preparing an active material which, when embedded into the pores of a metallic plaque, is able to be electrochemically reduced to a species of iron which can subsequently be reoxidized and re-reduced very efficiently. This active material contains a mixture of iron III ($Fe^{3+}$) oxides ($\alpha Fe_2O_3 \cdot H_2O$ and $\gamma Fe_2O_3 \cdot H_2O$), FeS and free S.

Our method of producing such an active material consists of dissolving hydrated ferric ammonium sulfate ($Fe(NH_4)(SO_4)_2 \cdot 12H_2O$) into deionized water and adding this solution to an aqueous solution of potassium hydroxide (KOH) and potassium sulfide ($K_2S$). We found that the iron salt solution must be added to the hydroxide-sulfide solution and not vice versa. This improvement in technique gives active material having a very broad range of sulfur content, while still maintaining good plate capacity and showing a substantial increase in capacity per unit weight values.

BRIEF DESCRIPTION OF THE DRAWINGS

For a better understanding of the nature and objects of the invention, reference may be made to the drawing which shows the effect of sulfur content on the iron plate per unit weight of active material ($Fe_2O_3 \cdot H_2O$, FeS, S) and unit volume of plate at a constant drain rate corresponding to 25 ma./cm.$^2$.

PREFERRED EMBODIMENTS OF THE INVENTION

The basic problem in preparation of iron battery plates is getting the largest weight of active iron per unit volume of plate in order to store as much capacity as possible per unit weight and volume of finished plate. At the same time one must maintain good utilization of active iron and high drain rate capabilities in the plate. This requires porosity for electrolyte circulation and high internal surface area for rapid reaction rates. Iron oxides prepared by certain procedures, herein described, have been found able to be reduced to give a high percentage utilization of the iron present.

Eight batches of precipitate active material were prepared having various weight percent ratios of Fe:S. These aimed for Fe:S weight percent ratios were 100:0, 95:5, 90:10, 85:15, 75:25 and 60:40. The precipitate having an Fe:S ratio of 100:0 contained no FeS or free S because no $K_2S$ was reacted. The other active material precipitates contained sulfur. For example, the Batch 7 precipitate active material had an Fe:S weight percent ratio of about 95:5 and contained 2.9 gr. pure sulfur and 55 gr. pure iron. By dividing 2.9 by 55, it appears that Batch 7 contained 5.3 weight percent sulfur based on the weight of iron.

The procedure used in preparing the active material in all the following examples was essentially the same for all the various Fe:S weight percent ratios. Basically, hydrated ferric ammonium sulfate $(Fe(NH_4)(SO_4)_2 \cdot 12H_2O)$, or other iron salt such as for example, hydrated ferrous ammonium sulfate, of a predetermined amount based on the salt's iron content, is dissolved into a fixed volume of deionized water. This aqueous solution is then poured into and chemically reacted with a vigorously stirred, aqueous hydroxide sulfide solution as for example, a solution of potassium hydroxide (KOH) and potassium sulfide ($K_2S$) of predetermined amounts. The ferric salt solution must be added to the hydroxide-sulfide solution and not vice versa. These solutions are stirred and allowed to react for 30 minutes. Then the precipitated reaction product is washed in deionized water and vacuum filtered. Vacuum filtering is done through two #80 pore size Eaton-Dikeman filter papers placed on a Buchner funnel. The deionized water wash and filtering operations are repeated at least three times or until an electrical resistivity of at least 2000 ohm-cm. is attained in the filter water. Another precipitate cleaning technique that can be used is centrifuging, adding deionized water and again centrifuging until the separated wash water is about 2000 ohm-cm. or greater in electrical resistivity.

After the precipitate has been washed and filtered, it is left on the last filter paper and oven dried (at 60–70° C.) to constant weight. The dried material is usually weighed just to enable yield determinations of various batches to be made and then reduced by grinding to a suitable particle size, at least 200 mesh (74 microns), or smaller and preferably 325 mesh (44 microns) or smaller for incorporating into porous plaque structures. The material is stored in sealed glass bottles until usage and is the active material of this invention.

The active material precipitate is of irregular configuration and contains a mixture of $Fe_2O_3$ i.e. ($\alpha Fe_2O_3 \cdot H_2O$ and $\alpha Fe_2O_3 \cdot H_2O$), FeS and S. In $\alpha$-iron (III) oxide, the oxide ions form a hexagonally close-packed array with Fe (III) ions occupying the octahedral interstices. In $\alpha$-iron (III) oxide, there is a cubic close-packed array of oxide ions with the Fe (III) ions distributed randomly over both octahedral and tetrahedral sites. Other reaction products such as $K_2SO_4$ are washed from the precipitated during the centrifuging or wash and filtering operations. It is believed that adding the ferric salt solution to the hydroxide-sulfide solution instead of vice versa, causes a more complete reaction and better distribution of sulfur throughout the active material precipitate and also results in better utilization of the active material. In any event, it is known that the active material prepared in accordance with this invention has a capacity greater than that prepared by the addition of potassium hydroxide and potassium sulfide to ferric ammonium sulfate.

The active material of this invention can be used in iron plates for batteries in numerous battery combinations as for example, one plate of a nickel-iron battery. Finished plates tested from material made using this process exhibit high capacity per unit weight and volume of electrode, high theoretical utilization of the iron, long life, good charge acceptance, high discharge rate capacity retention and, small voltage polarization as current density is increased.

EXAMPLE 1

Preparation of Batch No. 1 (85:15 aimed for Fe:S) involved the following steps: (1) 482 grams $$Fe(NH_4)(SO_4)_2 \cdot 12H_2O$$

were dissolved into 800 ml. deionized water, (2) 179 grams of KOH (85 weight percent pellets) were added to 33 grams of $K_2S$ and the mixture was dissolved into 800 ml. of deionized water, (3) the ferric ammonium sulfate solution of step (1) was added to the hydroxide-sulfide solution of step (2) while vigorously stirring the hydroxide sulfide solution, (4) after 30 minutes the precipitated reaction product was washed in deionized water and filtered to obtain clean precipitate (5) the precipitate was dried at 60° C. weighed and crushed.

EXAMPLE 2

In the preparation of Batch No. 2 (85:15 aimed for Fe:S steps (1)–(5) were the same as in Batch No. 1.

EXAMPLE 3

In the preparation of Batch No. 3 (85:15 aimed for Fe:S) steps (1)–(5) were the same as in Batch No. 1.

EXAMPLE 4

In the preparation of Batch No. 4 (75:25 aimed for Fe:S) step (1) was the same as in Batch No. 1, then (2) 132 grams of KOH (85 weight percent pellets) was added to 65 grams $K_2S$ and the mixture was dissolved into 800 ml. of deionized water, steps (3) to (5) were the same as in Batch No. 1.

EXAMPLE 5

In the preparation of Batch No. 5 (60:40 aimed for Fe:S) step (1) was the same as in Batch No. 1, then (2) 50 grams of KOH (85 weight percent pellets) was added to 128 grams $K_2S$ and the mixture was dissolved into 800 ml. of deionized water, steps (3) to (5) were the same as in Batch No. 1.

EXAMPLE 6

In the preparation of Batch No. 6 (90:10 aimed for Fe:S) step (1) was the same as in Batch No. 1, then (2) 187 grams KOH (85 weight percent pellets) were added to 22 grams $K_2S$ and the mixture was dissolved into 800 ml. of deionized water, steps (3) to (5) were the same as in Batch No. 1.

EXAMPLE 7

In the preparation of Batch No. 7 (95:5 aimed for Fe:S) step (1) was the same as Batch No. 1, then (2) 205 grams KOH (85 weight percent pellets) were added to 10 grams $K_2S$ and the mixture dissolved into 800 ml. of deionized water, steps (3) to (5) were the same as in Batch No. 1.

EXAMPLE 8

In the preparation of Batch No. 8 (100 Fe, no S) step (1) was the same as Batch No. 1, then (2) 217 grams KOH (85 weight percent pellets) were dissolved into 800 ml. deionized water (no $K_2S$), steps (3) to (5) were the same as in Batch No. 1.

To determine the composition and structure of these precipitated active materials, analysis and identification was made using spectrographic, X-ray diffraction, X-ray fluorescence, wet chemical and infrared techniques. These results are summarized in Table I.

TABLE I

| Sample | Aim, Fe:S | X-ray diffraction $\alpha Fe_2O_3 \cdot H_2O$ | S | Infrared analysis | Wet chemical, Fe actual | X-ray fluorescence, S actual | Actual, Fe:S |
|---|---|---|---|---|---|---|---|
| Batch 1 | 85:15 | Major | Minor | $\alpha + \gamma Fe_2O_3 \cdot H_2O + FeS^*$ | 50.1 | 10.4 | 83:17 |
| Batch 2 | 85:15 | do | Trace | | 55.6 | 7.4 | 88.2:11.8 |
| Batch 3 | 85:15 | do | do | $\alpha + \gamma Fe_2O_3 \cdot H_2O + FeS^*$ | 55.0 | 8.4 | 87:13 |
| Batch 4 | 75:25 | do | Major | | 47.1 | 22.0 | 68.2:31.8 |
| Batch 5 | 60:40 | Trace | do | | 28.4 | 56.0 | 33.7:66.3 |
| Batch 6 | 90:10 | Major | | | 57.5 | 4.5 | 92.8:7.2 |
| Batch 7 | 95:5 | Amorphous | | | 57.6 | 3.2 | 94.7:5.3 |
| Batch 8 | 100.0 | do | | $\alpha Fe_2O_3 \cdot H_2O$ | 62.9 | 0 | 100:0 |

*Free S not detectable by infrared analysis.

X-ray diffraction showed $\alpha Fe_2O_3 \cdot H_2O$ and sulfur in Batch Nos. 1–5. Batch Nos. 7 and 8 were identified as amorphous. Infrared analysis of Batch No. 1 and No. 3 showed these materials to be not $\alpha$-iron (III) oxide alone but a mixture of $\alpha Fe_2O_3 \cdot H_2O$ and $\gamma Fe_2O_3 \cdot H_2O$. We feel the infrared technique is the superior one and that the resultant dried product of the coprecipitation is a mixture of $\alpha + \gamma Fe_2O_3 \cdot H_2O$, FeS, and S. Emission spectroscopy did not reveal any significant impurities in any of the raw materials or in any of the precipitates. The aimed for Fe:S ratios are in agreement except in Batch 5 where an initial preparation mistake must have been made.

All materials prepared were tested by impregnating them into sintered nickel fiber plaques. The capacities of the various plates were compared after constant charging conditions and discharging through a constant current power supply at drain rates corresponding to between 10 and 200 ma./cm.² of plate projected surface area.

The optimum material composition is determined by comparing the capacities of the plates with respect to both weight of the active material and volume of the iron plate, since both of these factors relate directly to energy density in a complete battery design. Data presented in Table II compare these results at one of the constant drain rates (25 ma./cm.²) which is typical of all results.

TABLE II

| Sample | Best capacity amp-hrs. at 25 ma./cm.² | Amp-hrs./gm. of active material | Best amp-hr./ cm.³ of iron plate |
|---|---|---|---|
| Batch 1 | 9.21 | 0.72 | 0.51 |
| Batch 2 | 5.73 | 0.75 | 0.54 |
| Batch 3 | 5.26 | 0.48 | 0.56 |
| Batch 4 | 4.80 | 0.32 | 0.38 |
| Batch 5 | 1.46 | 0.20 | 0.22 |
| Batch 6 | 4.52 | 0.24 | 0.15 |
| Batch 7 | 1.62 | 0.13 | 0.17 |
| Batch 8 | 0.5 | 0.003 | 0.006 |

It is shown that the preferred range for the Fe:S weight percent ratio is between 93:7 (Batch 6) and about 68:32 (Batch 4). However, properties of interest are still obtainable slightly on either side of this range; e.g. as high as 95:5 (Batch 7) and as low as 34:66 (Batch 5). This data is shown graphically in the drawing. The peak in the capacity per unit weight of active material and volume of plate occurs when the weight percent ratio of iron to sulfur in the material that is initially impregnated into the pores of the plaque is between the above-mentioned values. The data of Table 2 shows that the maximum in capacity per se occurs at 87:13 (Batch 3). All these factors then describe the optimum weight percent ratio range of Fe:S.

Other electrochemical tests were conducted wherein the active material of this invention was impregnated into 7" x 9" plaques averaging 35 mils in thickness. They were charged 2 hrs. at 26 amps. The discharge in these half cell tests was through a constant current power supply at 10 amps. Under these discharge conditions we found that our active material gave capacity per unit weight values on the order of .8 amp-hr./gram iron.

What we claim is:

1. A method of producing active battery material comprising adding a solution of (A) an iron salt to a solution of (B) a hydroxide-sulfide, and mixing to produce a precipitate comprising $Fe^{3+}$ oxide and sulfur.

2. The method of claim 1 wherein the iron salt solution is selected from the group consisting of ferric ammonium sulfate solution and ferrous ammonium sulfate solution.

3. The method of claim 1 wherein the hydroxide is potassium hydroxide and the sulfide is potassium sulfide.

4. The method of claim 1 wherein the iron salt and hydroxide-sulfide solutions are mixed in such proportions to give an iron to sulfur ratio in the active material of at least 5 weight percent sulfur, based on the weight of iron.

5. A method of producing active battery material comprising, adding (A) an iron salt solution selected from the group consisting of ferric ammonium sulfate solution and ferrous ammonium sulfate solution to (B) a solution of potassium hydroxide and potassium sulfide, and mixing to produce a product precipitate comprising $Fe^{3+}$ oxide and sulfur, said precipitate having a sulfur content of at least 5 weight percent based on the weight of iron and recovering the precipitate.

6. The method of claim 5 wherein the active material precipitate has an Fe:S weight percent ratio from 95:5 to 34:66.

7. The method of claim 5 wherein the active material precipitate has an Fe:S weight percent ratio from 93:7 to 68:32.

8. The method of claim 5 wherein the precipitate is cleaned after recovery.

References Cited

UNITED STATES PATENTS 2,871,281  1/1959  Moulton et al. _____ 136—25

WINSTON A. DOUGLAS, Primary Examiner

C. F. LE FEVOUR, Assistant Examiner

U.S. Cl. X.R.

136—120